Patented Sept. 1, 1942

2,294,811

UNITED STATES PATENT OFFICE 2,294,811

CRYSTALLIZED GLUCOSIDE FROM RED SQUILL

Arthur Stoll and Jany Renz, Basel, Switzerland, assignors to Sandoz A. G., Basel, Switzerland No Drawing. Application July 17, 1939, Serial No. 284,964. In Switzerland June 27, 1939

3 Claims. (Cl. 260—210)

The present invention relates to a new crystallized glucoside and to a process for the isolation thereof from red squill.

The use of the red squill is well known in the art to exterminate rodents like rats and mice. Its use presents insofar a special interest as the toxic principle of the red squill in deadly doses for rodents is not dangerous for other animals. But as the content of the red squill in active principle is very unstable, this being due to the art of growing, harvesting, provenience and storage, the use of raw extracts or of dry preparations from red squill for exterminating rodents gives very uncertain results.

Several methods for the preparation of the active principle in enriched form have been proposed, but not one of them has led to uniform products. The active principle has been extracted together with impurities by treating the red squill with acetone (F. R. Winton, Journ. of Pharmacology and exp. Therap. 31, 123, 1927) or with alcohol acidulated with acetic acid (L. A. Danzel, Annales d'Hygiène 1935, pages 677–701) or with water, aqueous ethanol and methanol (D. Mann, Seifensieder Zeitung 63, 721, 1936; 64, 255, 273, 1937; French Patent 807,294; U. S. Patent 1,952,977).

Subsequent purifying operations have been carried out by F. H. J. Picard (Dissertation Utrecht 1936) in the following manner: The acetone extracts were treated with lead compounds, the cardio-active glucosides present in the extract were destroyed by heating the dry preparations at 105–110° C. and the toxic substance was adsorbed by charcoal. F. J. Leblanc and C. O. Lee (Journ. of the American pharmaceut. Assoc. 28, 151, 1939) have extracted dried bulbs with 80% ethanol and adsorbed the toxic principle from aqueous solutions by charcoal.

It has now been found that a new crystallized glucoside possessing very strong toxic properties for rodents can be extracted from red squill, if extracts prepared from red squill by any usual method are extracted in presence of water with an organic solvent nonmiscible with water and to which is preferably added an appropriate amount of an alcohol with at least 4 carbon atoms.

The new technical process is based on the observation that the rodent poison which can only be difficultly extracted from its aqueous solutions by an organic solvent nonmiscible with water, can easily and quantitatively be extracted therefrom, when an alcohol with at least 4 carbon atoms, and this even in small quantities, is added to the organic solvent.

According to the present process it is, therefore, possible to isolate a new crystallized glucoside which represents the specific toxic principle for rodents contained in red squill and to make preparations containing a quite definite quantity of the poison together with ingredients yielding an aroma to attract the rodent as well as edible and/or sweetening ingredients For the preparation of extracts from red squill that contain almost the totality of the new glucoside and as less as possible impurities we use methanol and ethanol. The extraction of well dried and finely powdered drug gives for example a preparation which can be submitted to subsequent treatments, whereby the extraction itself can be carried out in the cold or at elevated temperature. The extracts obtained in this manner and still containing dyestuffs and impurities, that decrease the crystallization power of the glucoside, are concentrated, dissolved in water and treated with a heavy metal hydroxide such as lead hydroxide. By this treatment the dyestuffs become precipitated, and the clear aqueous greenish yellow filtrate contains the totality of the rodent poison. The glucoside is then isolated from the solution by extracting it according to the invention with an organic solvent.

As organic solvents useful for this purpose we may cite the acyclic, cyclic and aromatic hydrocarbons and their halogenated and nitrated derivatives, further ethers, esters and alcohols which contain at least 4 carbon atoms.

As solvents especially suitable for this purpose we name the halogenated hydrocarbons such as choloroform, methylene-chloride, carbontetrachloride and as alcohols which facilitate the extraction, there may be cited the butylalcohols, amylalcohols, hexylalcohols, benzylalcohol, cyclohexanol, etc., whereby those possessing low boiling point will be preferably employed.

For carrying out the extraction of the glucoside, it is not necessary to submit the raw extracts from the drug to a purification by means of heavy metals, but it is preferable to separate the impurities such as fats, oils, yellow decomposition products and the like, which are soluble in organic solvents, by extracting them with a small quantity of choroform, ether or petrol ether.

On shaking an aqueous extract prepared from red squill and containing the new glucoside, with chloroform to which have been added for example 15–20% or more of butyl alcohol, the new glucoside and the cardio-active glucosides of the squill which are characterized by the Lieberman's color reaction, go quantitatively into the chloroform layer. The evaporation residue of such chloroform-butyl alcohol layer is rich in new glucoside, but the same cannot be crystallized therefrom. In order to separate it from the cardio-active glucosides, the residue obtained as described above is dissolved or suspended in water and shaken with chloroform or an other suitable solvent not miscible with water to which have been added up to 5% of an alcohol with at least 4 carbon atoms, like butyl alcohol. The cardio-active glucosides and other impurities remain in the aqueous layer, whereas the new glucoside is contained in the organic solvent layer and this already in such a degree of purity, that it can be crystallized therefrom. On evaporation of this layer and on rubbing the residue with some methanol and water the glucoside crystallizes out and can be obtained in quite pure form by recrystallization from methanol-water.

The new glucoside crystallizes from methanol-water (1:2) in form of prisms cut at the ends in form of roof; it is easily soluble in low molecular alcohols, more difficultly soluble in acetone, very difficultly soluble in other organic solvents. At the Liebermann's color reaction, that is on adding some drops of concentrated sulphuric acid to a solution of the substance in acetic acid anhydride, the color changes from violet over blue to blue-green. The Legal's test with sodium nitroprussiate is negative. The substance dried in high vacuo melts under decomposition and yellowishing at 168–170° C. (corr.). In methanol solution its rotation power is $[\alpha]^{20}_D = -59°$ (c=1). The new glucoside contains one molecule of glucose. According to the data obtained by analysis, equivalent weight determination, alkaline titration under opening of a lactone ring and splitting off of an acyl group and from the sugar content, its composition seems to be $C_{32}H_{46}O_{12}$.

On exhaustive acetylation, four acetyl groups are introduced into the new glucoside and a new crystallized compound of composition $C_{40}H_{54}O_{16}$ is obtained. This acetyl compound melts at 199° C. (corr.) without decomposition and has the optical rotation in methanol solution $[\alpha]^{20}_D = -49°$ to $-50°$ (c=1).

The absolute lethal dose for rats, that is the dose which causes death of all test animals, is for male animals 1.6 mg./kg. and for females 0.5 mg./kg. The values for the acetyl compound are somewhat higher, namely for male animals 5 mg./kg., for females 2.5 mg./kg. It is proposed to use the new glucoside particularly for combating rodents.

It results from the above description that the objects of the present invention are, first, the new glucoside possessing strong toxicity for rodents and quite definite chemical properties cited above, secondly, the process for the extraction of the new glucoside in the manner herein above described or with small alterations or modifications which are common to every one skilled in the art.

The following example, without being limitative, illustrates a mode of carrying out the present process, the parts being by weight.

100 parts of fresh red squill bulbs are cut into small pieces, dried in a stream of hot air (of about 60° C.) and finely powdered. The dry powder (about 20 parts) are then extracted three times with each time 50 parts of absolute ethanol and the extracts thus obtained, which have a dark red color, are evaporated in vacuo at low temperature to dryness. The obtained residue (about 1–2 parts) is taken up in 50 parts of water and a suspension of about 0.4–0.5 part of freshly prepared and neutral lead hydroxide is added thereto. After filtration, the clear, slightly colored solution is concentrated in vacuo at low temperature to about 5–10 parts and shaken five times with each time 2 parts of chloroform to which 20% of butanol have been added.

The chloroform-butanol layer is then evaporated in vacuo, whereby a residue (about 0.05–0.08 part) is obtained. This preparation is of pale yellow color and gives a strong blue-green Liebermann's color reaction. This residue is then taken up in 2 parts of water, whereby a part of the substance remains in suspension, and shaken with 1 part of chloroform in order to separate the yellow sticky substances which are then thrown away. The aqueous solution is then extracted 8–10 times with each time 1 part of chloroform, to which 5% of butanol have been added. Thereby the new glucoside goes completely into the chloroform-butanol layer, whereas the cardio-active glucosides remain in the aqueous solution.

The residue obtained after evaporation of the total chloroform-butanol layer is according to the quality of the starting material of 0.01–0.05 part. It is dissolved in some methanol and water is added thereto, until the solution becomes cloudy. After standing for some time the new glucoside crystallizes out in a yield that varies with the quality of the starting material (about 0.003–0.02 part). On recrystallization from methanol—water it can be obtained in pure form and possesses then the above cited properties.

What we claim is:

1. A process for the isolation of a new crystallized glucoside from red squill, comprising the steps of extracting the new glucoside in presence of water, from tannoid-free preparations and extracts from red squill, by means of a mixture of chloroform and butanol, and isolating the new glucoside from the chloroform-butanol fractions.

2. A process for the isolation of a new crystallized glucoside from red squill, comprising the steps of extracting the new glucoside from tannoid-free aqueous extracts from red squill by treating such extracts with chloroform containing 20% of butanol, evaporating the chloroform-butanol fractions, taking up the residue of evaporation in water, separating the new glucoside from the cardio-active glucosides by extracting it with chloroform to which about 5% of butanol have been added and isolating the glucoside by evaporating the chloroform-butanol fractions.

3. A process for the isolation of a new crystallized glucoside from red squill, comprising the steps of dissolving a tannoid free extract of red squill in water, extracting the new glucoside from this aqueous solution with the aid of an alcohol with 4 to 7 carbon atoms in presence of an organic solvent nonmiscible with water and isolating the glucoside from its solution in the said mixture of organic solvents.

ARTHUR STOLL.
JANY RENZ.